US009329666B2

(12) United States Patent
Shippy

(10) Patent No.: US 9,329,666 B2

(45) Date of Patent: May 3, 2016

(54) POWER THROTTLING QUEUE

(71) Applicant: Advanced Micro Devices, Inc., Sunnyvale, CA (US)

(72) Inventor: David J. Shippy, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 508 days.

(21) Appl. No.: 13/724,583

(22) Filed: Dec. 21, 2012

(65) Prior Publication Data

US 2014/0181561 A1 Jun. 26, 2014

(51) Int. Cl.
*G06F 1/32* (2006.01)

(52) U.S. Cl.
CPC ............ *G06F 1/3287* (2013.01); *G06F 1/3225* (2013.01); *G06F 1/324* (2013.01); *G06F 1/3296* (2013.01)

(58) Field of Classification Search
CPC ..... G06F 1/3287; G06F 1/3225; G06F 1/324; G06F 1/3296
See application file for complete search history.

(56) References Cited

U.S. PATENT DOCUMENTS 5,167,024 A 11/1992 Smith et al.
5,392,437 A 2/1995 Matter et al.
RE36,839 E 8/2000 Simmons et al.
7,353,331 B2 * 4/2008 Shankara ................ H04L 45/00 370/428
7,406,554 B1 * 7/2008 Huffman ............. G06F 13/1642 710/112
7,587,532 B2 * 9/2009 Nye et al. ........................ 710/52
7,865,747 B2 * 1/2011 Buyuktosunoglu et al. .. 713/320
2002/0053038 A1 * 5/2002 Buyuktosunoglu et al. .. 713/320
2005/0044435 A1 * 2/2005 Zdravkovic ................... 713/320
2006/0179186 A1 * 8/2006 Nye et al. ........................ 710/52
2007/0086472 A1 * 4/2007 Shankara ................ H04L 45/00 370/428
2008/0229050 A1 * 9/2008 Tillgren ................ G06F 1/3225 711/200
2010/0017542 A1 * 1/2010 Merry, Jr. ................ G06F 3/061 710/15
2010/0332861 A1 * 12/2010 Allalouf et al. ............... 713/300
2013/0019080 A1 * 1/2013 Levinsky ............ G06F 12/1027 711/206

* cited by examiner

*Primary Examiner* — Abdelmoniem Elamin

(74) *Attorney, Agent, or Firm* — Polansky & Associates, P.L.L.C; Paul J. Polansky

(57) ABSTRACT

A power throttling queue includes a queue and a throttling circuit. The queue has multiple entries. Each entry has a data field and a valid field. The multiple entries include a first portion and a selectively disabled second portion. The throttling circuit is coupled to the queue, and selectively disables the second portion in response to a number of valid entries of the first portion.

20 Claims, 3 Drawing Sheets

POWER THROTTLING QUEUE

FIELD

This disclosure relates generally to digital circuits, and more specifically to queues.

BACKGROUND

Data processors are typically designed to meet specific product needs. For example, certain products such as multimedia mobile phones can at various times need either high performance or low power consumption. For example when running certain games, a multimedia mobile phone needs the microprocessor to provide high performance. However when running other tasks such as EMAIL and voice calling, the multimedia mobile phone needs much lower performance from the microprocessor. These varying processing environments make it difficult for the microprocessor designer to achieve the right balance between performance and preservation of battery life.

Power gating is one approach used for preservation of battery life. Power gating generally uses a metal oxide semiconductor field effect transistor (MOSFET) with a higher threshold voltage ($V_{TH}$) and a lower leakage current to switch power on or off to lower $V_{TH}$ transistors that form the functional circuits. A data processor typically has multiple functional units, for example, central processing unit (CPU) cores. Each core has sub-functional units such as a microcode unit and a data cache. When the data processor is executing instructions that will not use microcode sequences, the data processor gates off clocks and power to the microcode unit to conserve power. Since data processors and their corresponding functional units continue to increase in complexity, thus increasing overall power consumption demands, continued improvement, focus, and refinement of techniques for reducing power consumption of integrated circuits is highly desired.

Figure 1:
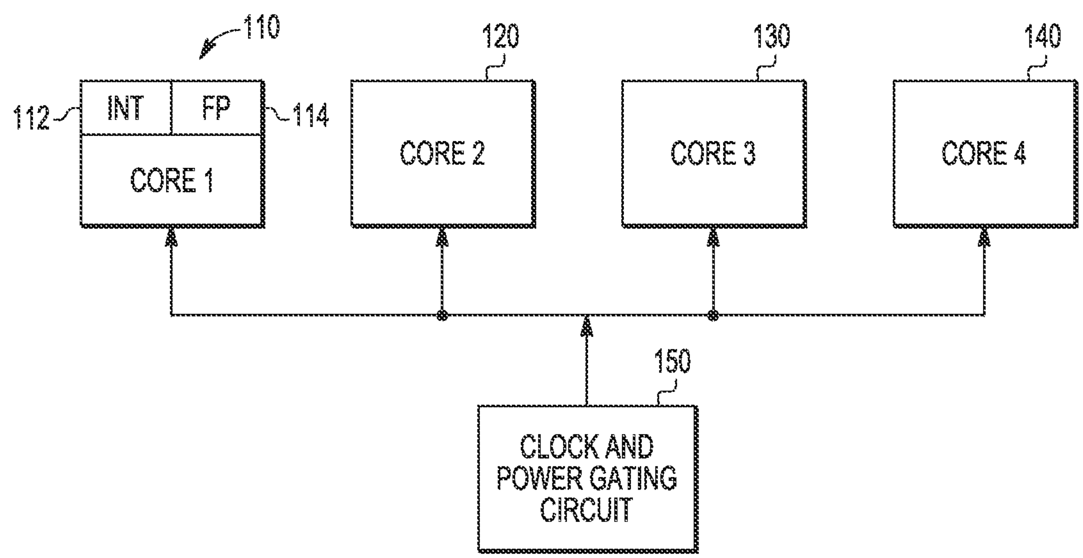
FIG. 1 illustrates in block diagram form a data processor according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

Queues are digital circuits that allow data to be stored in a certain order prior to use. Queues are useful in a variety of circuits, such as communication controllers, data handling circuits, various parts of data processors, memories, system controllers, peripheral controllers, and the like. For example, a high-performance pipelined data processor may use a queue as a buffer between an instruction decoder and an execution unit to store decoded instructions and their required operands before the execution unit is able to execute them. Since the queue has many entries for storing sets of instructions and operands, and shifts the bits of valid entries to corresponding bit positions of adjacent entries as the instruction decoder fills the queue, the queue consumes a significant amount of power, and the power consumption increases with the size of the queue.

However for some applications such as high performance data processors, the utilization of queues tends to be bimodal. When the data processor's workload is relatively low, the number of valid entries of the queue will likely be small and the queue will remain relatively empty. When the data processor's workload is relatively high, the number of valid entries increases and the queue will remain relatively full. Thus the queue will alternate between being relatively empty and relatively full.

A power throttling queue as disclosed below has a queue with multiple entries having a first portion and a selectively disabled second portion, and a throttling circuit connected to the queue to selectively disable the second portion in response to a number of valid entries of the first portion. Thus the effective size of the queue can be dynamically changed and during periods of low utilization the unneeded portion can be powered off. Moreover the size change does not depend on the state of other circuits and thus the power throttling is autonomous. For example when the first portion of the queue has been filled with valid entries or is nearly full, the second portion can be enabled, and when less than all the entries of the first portion are valid, the second portion can be disabled. In this way, the number of valid entries of the first portion operates conceptually as a "watermark" or "high water threshold" to indicate when the second portion of entries will soon be useful or will not soon be needed. In some embodiments, the power throttling mechanism can be overridden such that the second portion of the queue is disabled regardless of the number of valid entries in the first portion in response to an override signal. In some embodiments, the throttling circuit can provide the override signal in response to a configuration field of a first register. For example, the throttling circuit can provide the override signal in response to a model specific register (MSR) of a data processor. Since the MSR can be accessed only in a privileged mode, the override mechanism is protected from being inadvertently altered by an application program.

FIG. 1 illustrates in block diagram form a data processor 100 according to some embodiments. Data processor 100 generally includes a CPU core 110 labeled "CORE 1", a CPU core 120 labeled "CORE 2", a CPU core 130 labeled "CORE 3", a CPU core 140 labeled "CORE 4", and a clock and power gating circuit 150. CPU core 110 includes an integer unit 112 labeled "INT", and a floating point unit 114 labeled "FP".

CPU cores 110, 120, 130, and 140 each have inputs for receiving a power supply voltage and a clock signal. Clock and power gating circuit 150 has an output connected to each input of CPU cores 110, 120, 130, and 140 for providing the clock and power supply voltages to be used by that core.

In operation, clock and power gating circuit 150 dynamically changes the power supply voltage level and operating frequency of each core based on the anticipated workload. Since power consumption of a particular core is a function of both the frequency and the square of the power supply voltage, clock and power gating circuit 150 advantageously runs the cores at a frequency estimated to be sufficient to handle the workload, and at a voltage for that frequency that is sufficiently large to ensure proper operation. Each voltage and frequency pair defines a unique “P-state”.

However clock and power gating circuit 150 is only able to change P-states relatively slowly, but the dynamic utilization of data processor 100 may change more rapidly. Data processor 100 includes, within each of cores 110-140, a mechanism to respond automatically and dynamically to the workload to reduce power consumption in a manner different than the P-state mechanism controlled by clock and power gating circuit 150, which will be describe more fully below.

Figure 2:
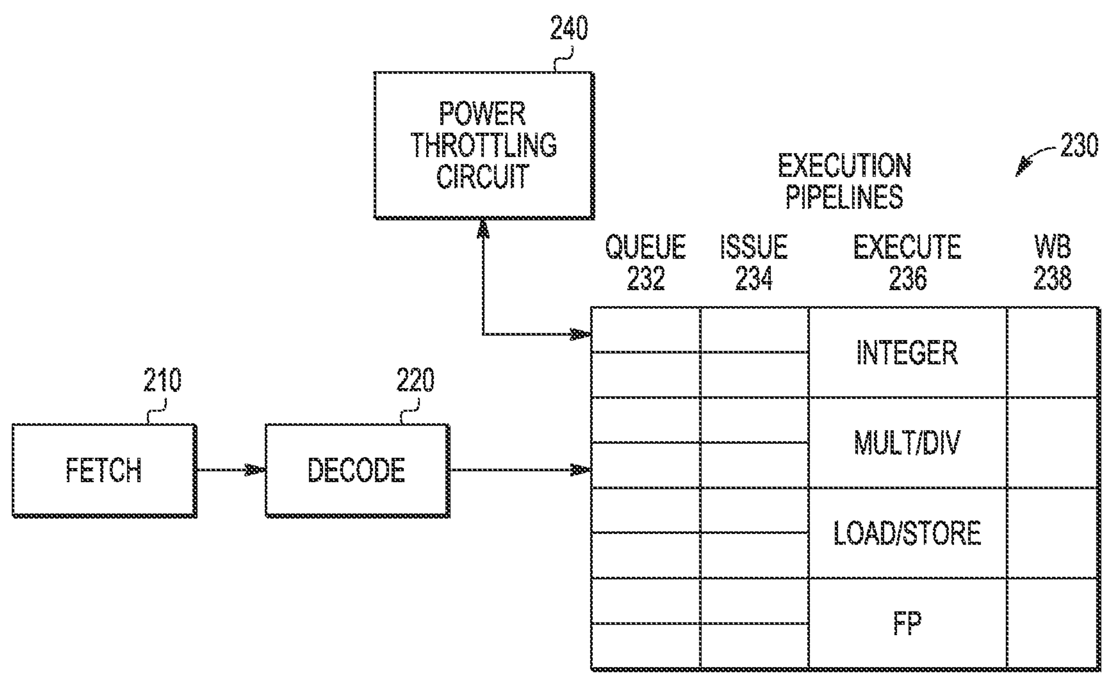
FIG. 2 illustrates in block diagram form a CPU core that may be used in the data processor of FIG. 1 according to some embodiments.

FIG. 2 illustrates in block diagram form a CPU core 200 that may be used in data processor 100 of FIG. 1 according to some embodiments. CPU core 200 generally includes a fetch unit 210, a decode unit 220, and a set of execution pipelines 230.

Fetch unit 210 has an output for providing instructions fetched from a cache or main memory (not shown). Decode unit 220 has an input for receiving instructions from fetch unit 210, and an output for providing decoded instructions.

Execution pipelines 230 include a queue sub-stage 232, an issue sub-stage 234, an execute sub-stage 236, and a write-back (WB) sub-stage 238. In the example shown in FIG. 2, execution pipelines 230 include two integer pipelines, two multiply/divide pipelines labeled “MULT/DIV”, two load/store pipelines, and two floating point pipelines labeled “FP”. Each of the pipelines of execution pipelines 230 has an input connected to the output of decode unit 220 to receive decoded instructions.

In operation, decode unit 220 decodes and dispatches instructions to selected ones of execution pipelines 230 for execution. In particular, queue sub-stage 232 queues operations to handle workloads without stalling decode unit 220. Queue sub-stage 232 also provides instructions to issue sub-stage 234. Issue sub-stage 234 provides operations to execute sub-stage 236 to perform integer multiply/divide, load/store, and floating point operations. The queue for each pipeline in execution pipelines 230 observes a bimodal usage model and can be implemented with a power throttling queue as further described above.

Figure 3:
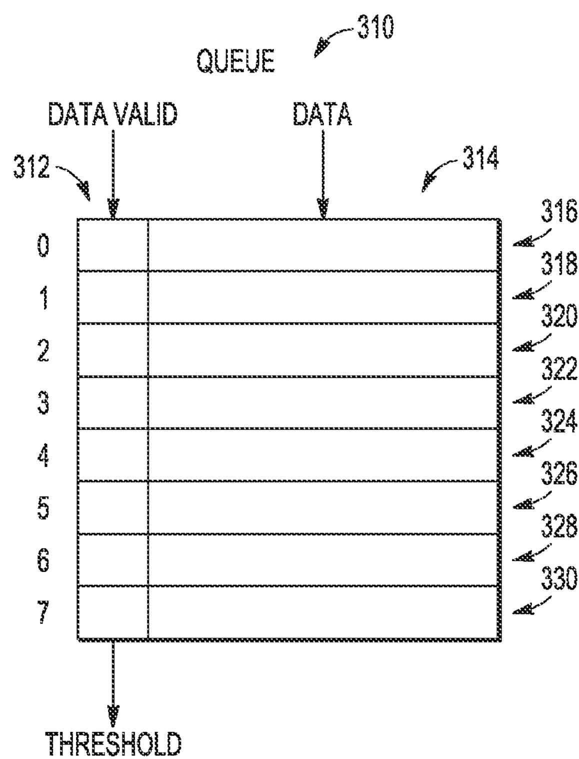
FIG. 3 illustrates in block diagram form a first queue that may be used in the CPU core of FIG. 2 according to some embodiments.

FIG. 3 illustrates in block diagram form a queue 300 that may be used in CPU core 200 of FIG. 2 according to some embodiments. Queue 300 is an eight-entry queue that includes entries 316-330. Each entry includes data and a valid bit corresponding to the data such that the entries collectively include a valid field 312 and a data field 314. Valid field 312 includes eight valid control bits numbered 0-7 and corresponding to entries 316-330, respectively.

Queue 300 receives new entries from a data producer such as a decode unit and outputs entries from an oldest entry first to a data consumer such as an issue stage of an execution pipeline. Thus queue 300 has an input to receive a valid bit labeled “Data Valid”, an input to receive data for the new entry labeled “Data”, and an output (not shown in FIG. 3) for providing data to the data consumer.

In operation, queue 300 clears the valid bits of all entries at power on reset. Afterward, upon receipt of a first entry, queue 300 stores the valid bit in Data Valid field 312 of entry 316 and the data in Data field 314 of entry 316. Entry 316 then becomes the oldest valid entry and is available to be read out. When additional entries are received, queue 300 shifts existing valid entries into adjacent, lower positions and stores the new valid bit in valid field 312 of entry 316 and the new data into Data field 314 of entry 316. When reading entries out, queue 300 determines the oldest valid entry and provides the data of that entry to the output, and invalidates the entry.

Figure 4:
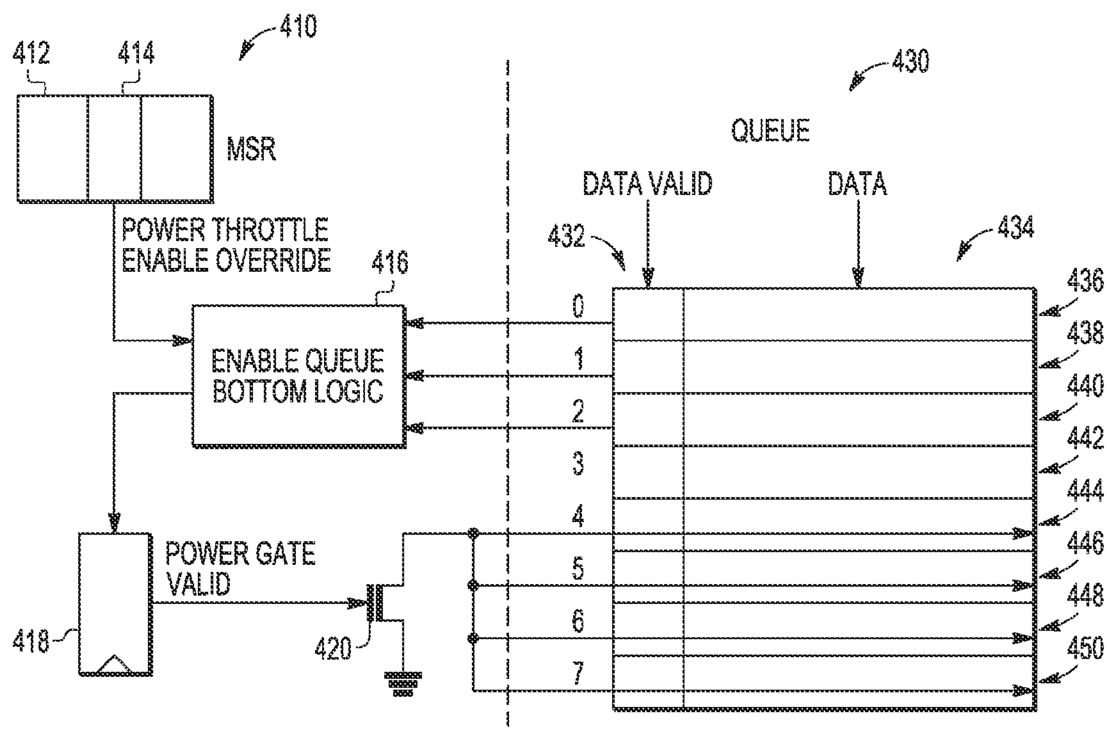
FIG. 4 illustrates in partial block diagram and partial schematic form a second queue that may be used in the CPU core of FIG. 2 according to some embodiments.

FIG. 4 illustrates in partial block diagram and partial schematic form a power throttling queue 400 that may be used in CPU core 200 of FIG. 2 according to some embodiments. Power throttling queue 400 generally includes a throttling circuit 410 and an eight-entry queue 430.

Throttling circuit 410 includes a register 412, an enable logic circuit 416 labeled “Enable Queue Bottom Logic”, a register 418, and a switch 420. In some embodiments, register 412 is a model specific register of data processor 100 that includes a field 414 defining a mode of CPU core 200. In some embodiments, switch 420 is an N-channel metal oxide semiconductor field effect transistor (MOSFET).

Register 412 has an output for providing the contents of field 414 labeled “Power Throttle Enable Override”. Enable logic circuit 416 has an input to receive the Power Throttle Enable Override signal from register 412, a second input, a third input, a fourth input, and an output. Register 418 has an input connected to the output of enable logic circuit 416, and an output for providing a power gate signal labeled “Power Gate Valid”. Switch 420 has a control terminal to receive signal Power Gate Valid from register 418, a first terminal connected to a ground terminal, and a second terminal.

Queue 430 includes eight entries 436-450 organized into a first portion of entries 436, 438, 440, 442, and a second portion of entries 444, 446, 448, and 450. Each entry includes data and a valid bit corresponding to the data such that the entries collectively include a valid field 432 and a data field 434.

Queue 430 has an input to receive the Data Valid bit, an input to receive the Data, and an output (not shown in FIG. 4) to provide data to a data consumer. Each entry includes data and a valid bit corresponding to the data such that the entries collectively include a valid field 432 and a data field 434. Valid field 432 includes eight valid bits numbered 0-7 and corresponding to entries 436-450, respectively. Second portion of entries 444-450 has a power supply terminal connected to the second terminal of switch 420.

In operation, queue 430 generally operates like queue 300, with respect to valid field 432, data field 434, power on reset, and normal operation. However, throttling circuit 410 has the capability to selectively disable the second portion (entries 444-450) based on the number of valid entries in the first portion (436-442).

Moreover, throttling circuit 410 also has the capability to disable the second portion of queue 430 regardless of the number of valid entries in the first portion in response to the Power Throttle Enable Override signal from field 414.

By providing a conceptual high water threshold in response to a number of active bits of valid field 432, throttling circuit 410 has the capability to selectively enable or disable an unused portion of queue 430 to save power including leakage power. Moreover by using a model specific register that can be accessed in privileged mode to establish modes of operation, data processor 100 provides a protected mechanism to seamlessly reconfigure CPU cores 110, 120, 130, and/or CPU core 140 by writing field 414 of register 412.

Note that in the illustrated embodiment, throttling circuit 410 sets the watermark at one less than the halfway point of queue 430. Setting the watermark at one less provides one additional entry that can be filled before the second portion is enabled when the queue is being filled. Note that since enable logic circuit 416 receives the valid bits of entries 0, 1, and 2, in some embodiments, register 412 can further include a field to select which of entries 436, 438, or 440 operates as the watermark so that power throttling queue 400 could be tailored for the characteristics of different application programs.

Figure 5:
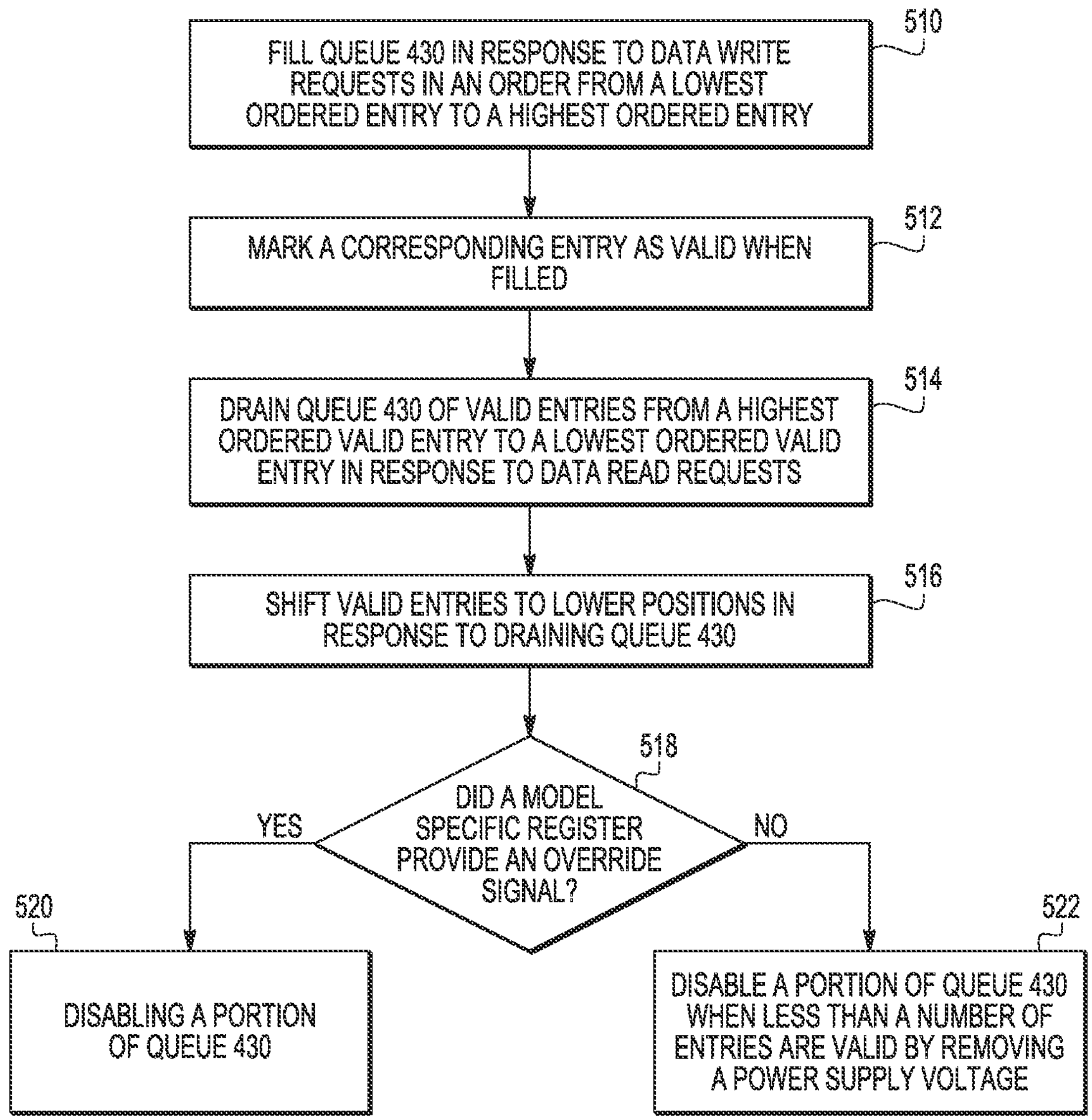
FIG. 5 illustrates a flow diagram of a method of operating a queue according to some embodiments.

FIG. 5 illustrates a flow diagram of a method 500 of operating power throttling queue 400 according to some embodiments. Action box 510 includes filling queue 430 in response to data write requests in an order from a lowest ordered entry to a highest ordered entry. Thus after the first data is received, entry 0 is filled, after the next data is received before any data is read out, entries 0 and 1 are filled with the older data shifted down to entry 1 and the newer data stored in entry 0, etc. Action box 512 includes marking a corresponding entry as valid when filled. Action box 514 includes draining queue 430 of valid entries from a highest ordered valid entry to a lowest ordered valid entry in response to data read requests. The highest ordered valid entry will be the entry with the oldest data in queue 430. Thus if entries 0 and 1 are both valid but entry 2 is not valid, entry 1 will be drained first since it has the oldest data. Action box 516 includes shifting valid entries to lower positions in response to draining queue 430.

The flow proceeds to decision box 518, which determines whether a model specific register provided an override signal. If so, flow proceeds to action box 520, which includes disabling a portion of queue 430 (regardless of the number of entries of the first portion of queue 430 that are valid). If not, flow proceeds to action box 522 that includes disabling a portion of queue 430 when less than a number of entries are valid by removing a power supply voltage.

The method of FIG. 5 may be implemented with various combinations of hardware and software, and the software component may be stored in a computer readable storage medium for execution by at least one processor. Moreover the method illustrated in FIG. 5 may also be governed by instructions that are stored in a computer readable storage medium and that are executed by at least one processor. Each of the operations shown in FIG. 5 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the power throttling queue of FIG. 4 or a circuit using a power throttling queue such as a data processor as shown in FIGS. 1 and 2 may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. In the illustrated embodiment, the power throttling queue was used in an execution pipeline of a CPU core in a multi-core data processor. In other embodiments, a power throttling queue as described herein could be used in other types of circuits, including a communication controller, a data handling circuit, a GPU, a CPU core, a memory sub-system, a system controller, a complex peripheral function, and so on. Also, functions and sub-functions of data processor 100, CPU core 200, and power throttling queue 400, could be formed on a single integrated circuit or could be formed on multiple integrated circuits. In the illustrated embodiment, the number of first portion entries 436-442 is equal to the number of second portion entries 444-450. In some embodiments, the number of entries in the two portions could be different. In the illustrated embodiment, switch 420 has a first terminal connected to a ground terminal, and a second terminal connected to a power supply terminal of second portion of entries 444-450. In some embodiments, switch 420 could have a first terminal connected to a different terminal, for example, a power supply terminal, and a second terminal connected to a power supply terminal of second portion of entries 444-450. In some embodiments, the order of writing and reading can be reversed, in which with each new data is stored at the next higher ordered entry that is not yet valid, and data is read from position 0 and valid data is shifted downward.

Accordingly, it is intended by the appended claims to cover all modifications of the disclosed embodiments that fall within the scope of the disclosed embodiments.

What is claimed is:

1. A power throttling queue comprising:

a queue having plurality of entries, each entry having a data field and a valid field, said queue filling entries in an order from a lowest ordered entry to a highest ordered entry, and draining entries from a highest ordered valid entry to a lowest ordered valid entry, said plurality of entries comprising a first portion and a selectively disabled second portion; and a throttling circuit coupled to said queue, for selectively disabling said second portion in response to a number of valid entries of said first portion, said throttling circuit keeping said second portion inactive regardless of said number of valid entries of said first portion in response to an override signal.

2. The power throttling queue of claim 1, wherein said throttling circuit further comprises a first register having a configuration field, wherein said throttling circuit provides said override signal in response to said configuration field.

3. The power throttling queue of claim 2, wherein said first register comprises a model specific register of a data processor.

4. The power throttling queue of claim 1, wherein said throttling circuit selectively disables said second portion by gating a power supply voltage to said second portion.

5. The power throttling queue of claim 4, wherein said power supply voltage is a ground voltage.

6. The power throttling queue of claim 1, wherein said first portion is substantially equal in number to said second portion.

7. A power throttling queue comprising:

a queue having plurality of entries, each entry having a data field and a valid field, said queue filling entries in an order from a lowest ordered entry to a highest ordered entry, and draining entries from a highest ordered valid entry to a lowest ordered valid entry, said plurality of entries comprising a first portion and a selectively disabled second portion; and a throttling circuit coupled to said queue, comprising:

an enable logic circuit having an input for receiving valid bits from a number of entries of said first portion, and an output for providing a power gate signal when said valid bits from said number of entries are active, said enable logic circuit keeping said second portion inactive regardless of said valid bits from said number of entries in response to an override signal; and a switch having first terminal for receiving a power supply voltage, a second terminal coupled to a power supply terminal of said second portion, and a control terminal for receiving said power gate signal.

8. The power throttling queue of claim 7, wherein said throttling circuit further comprises a first register having a configuration field, wherein said throttling circuit provides said override signal in response to said configuration field.

9. The power throttling queue of claim 8, wherein said first register comprises a model specific register of a data processor.

10. The power throttling queue of claim 7, wherein said first portion is substantially equal in number to said second portion.

11. The power throttling queue of claim 7, wherein said switch comprises a metal oxide semiconductor field effect transistor (MOSFET).

12. The power throttling queue of claim 7, wherein said power supply voltage is a ground voltage.

13. The power throttling queue of claim 7, wherein said throttling circuit further comprises a second register coupled to said output of said enable logic circuit for storing said power gate signal.

14. A method for operating a queue comprising:

filling the queue in response to data write requests in an order from a lowest ordered entry in a first portion to a highest ordered entry in a selectively disabled second portion;

marking an entry as valid when filled;

draining the queue of valid entries from a highest ordered valid entry to a lowest ordered valid entry in response to data read requests;

shifting valid entries to lower positions in response to said draining;

disabling said second portion of the queue when less than a number of entries of said first portion of the queue are valid; and disabling said second portion of the queue, in response to an override signal, regardless of said number of entries of said first portion that are valid.

15. The method of claim 14, wherein said disabling comprises disabling said second portion of the queue regardless of said number of entries of said first portion that are valid in response to a configuration field of a model specific register.

16. The method of claim 14, wherein said disabling said portion of the queue comprises removing a power supply voltage.

17. The method of claim 16, wherein said removing said power supply voltage comprises removing a ground voltage.

18. The power throttling queue of claim 1, wherein said throttling circuit further comprises a first register for selecting which entry of said first portion, when valid, causes said throttling circuit to enable said second portion.

19. The power throttling queue of claim 7, wherein said throttling circuit further comprises a first register for selecting which entry of said first portion, when valid, causes said enable logic circuit to deactivate said power gate signal.

20. The method of claim 14, further comprising:

selecting said number of entries of said first portion in response to a state of a register.

* * * * *